Patented Feb. 24, 1925.

1,527,894

UNITED STATES PATENT OFFICE.

BERTRAM MAYER, OF BASEL, AND JAKOB WÜRGLER, OF NEUEWELT, NEAR BASEL, SWITZERLAND, ASSIGNORS TO THE SOCIETY OF CHEMICAL INDUSTRY IN BASLE, OF BASEL, SWITZERLAND.

ANTHRAQUINONE DERIVATIVE AND PROCESS OF MAKING THE SAME.

No Drawing. Application filed January 4, 1924. Serial No. 684,450.

*To all whom it may concern:*

Be it known that we, BERTRAM MAYER and JAKOB WÜRGLER, both citizens of the Swiss Republic, and residing, the former at Basel, Switzerland, and the latter at Neuewelt, near Basel, Switzerland, have invented a new and useful Anthraquinone Derivative and a Process of Making the Same, of which the following is a full, clear, and exact specification.

This invention relates to a new anthraquinone derivative and to a novel and useful process of making the same.

It has been found that a new anthraquinone derivative, the anthraquinone-2-thioglycolic-3-carboxylic acid, is obtained by reacting in any desired order with one molecular proportion of a metallic sulphide on one molecular proportion of a 2-halogenanthraquinone-3-carboxylic acid and one molecular proportion of a monohalogenacetic acid.

The anthraquinone-2-thioglycolic-3-carboxylic acid thus obtained, which is of great industrial importance as a starting material for the manufacture of valuable new dyestuffs and intermediate products, forms a yellow powder which becomes brown at about 190° C. It is with difficulty soluble in nitrobenzene, alcohol, glacial acetic acid and hot water, but dissolves easily in sulphuric acid to a deep scarlet red, in chlorosulphonic acid to a brown-orange, and in cold alkali to an olive-yellow solution.

It corresponds with great probability to the following formula:

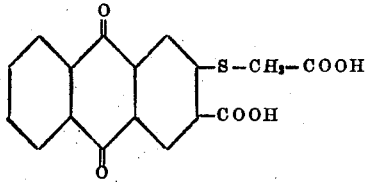

In order to illustrate the new process more fully the following examples are given, the parts being by weight.

*Example 1.*

94.5 parts of monochloracetic acid are dissolved while adding 55 parts of soda in 400 parts of water and then mixed with a concentrated solution of alkali polysulphide prepared from 128 parts of crystallized sodium sulphide and 32 parts of sulphur. The mass thus obtained is heated for some time at 95° C., filtered from the sulphur which has separated, and then reduced at 70° C. with 77 parts of zinc dust and 410 parts of hydrochloric acid. The mass is filtered once more and by adding common salt the thioglycolic acid precipitates as a sodium salt from the filtrate made neutral by means of soda.

46.2 parts of sodium thioglycolate and 92 parts of sodium 2-chloroanthraquinone-3-carboxylate are heated with 600 parts of water in a closed vessel for several hours at 120° C.

After cooling the clear brown product of the reaction which separates is extracted by means of hot sodium carbonate solution and the hot extract is mixed with dilute sulphuric acid to produce a precipitate.

*Example 2.*

286 parts of 2-chloroanthraquinone-3-carboxylic acid are dissolved while adding caustic soda lye in 2000 parts of water and then mixed with 250 parts of crystallized sodium sulphide. The mixture is boiled for one hour while stirring. Afterwards dilute hydrochloric acid is added and the crude 2-mercaptoanthraquinone-3-carboxylic acid which has separated is filtered off. It is purified by careful recrystallization from dilute soda solution. The 2-mercaptoanthraquinone-3-carboxylic acid forms a brown power which dissolves in sulphuric acid to a red and in caustic soda lye to a blue-red solution.

28 parts of the 2-mercaptoanthraquinone-3-carboxylic acid thus obtained are introduced into 100 parts of alcohol and the mixture is mixed with 10 parts of monochloracetic acid and 14.4 parts of potassium hydroxide. A spontaneous reaction occurs with a considerable rise of temperature. The mixture is then stirred for one hour at about 70° C. and filtered the solid matter being washed with alcohol. The solid matter is then extracted hot with 500 parts of water and after cooling the liquid is filtered; anthraquinone-2-thioglycolic-3-carboxylic acid is precipitated from the filtrate by means of a mineral acid.

What we claim is:

1. The process for the manufacture of a new anthraquinone derivative, namely the anthraquinone-2-thioglycolic-3-carboxylic acid, which consists in reacting in any dedesired order with one molecular proportion of a metallic sulfide on one molecular proportion of a 2-halogenanthraquinone-3-carboxylic acid and one molecular proportion of a monohalogenacetic acid.

2. As a new product of manufacture the herein described new intermediate product of the anthraquinone series, the anthraquinone-2-thioglycolic-3-carboxylic acid having most probably the formula:

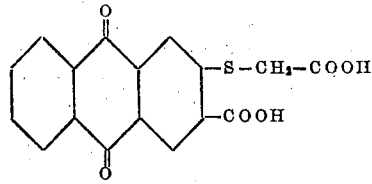

which forms a yellow powder becoming brown at 190° C. and dissolving in nitrobenzene, alcohol, glacial acetic acid and hot water with difficulty, but easily soluble in sulphuric acid to a deep scarlet-red, in chlorosulphonic acid to a brown-orange, and in cold alkali to an olive-yellow solution.

In witness whereof we have hereunto signed our names this 20th day of December, 1923, in the presence of two subscribing witnesses.

BERTRAM MAYER.
JAKOB WÜRGLER.

Witnesses:
    AMAND BAUM,
    M. SPENGLER.